3,823,020
WATER EMULSION PASTE STENCIL INK

John L. Gilson, Morton Grove, and Gail L. Strachan, Skokie, Ill., assignors to A. B. Dick Company, Niles, Ill.
No Drawing. Continuation of abandoned application Ser. No. 43,222, June 3, 1970. This application Nov. 9, 1971, Ser. No. 197,186
Int. Cl. C09d 11/08
U.S. Cl. 106—30                     10 Claims

ABSTRACT OF THE DISCLOSURE

A water emulsion paste ink for stencil duplication formulated of petroleum sulfonate, tinctorial agent, surface active agent and a rosinous binder with mineral oil subdivided into one component having an API number below 26 and another component having an API number above 32.

---

This is a continuation of application Ser. No. 43,222, filed June 3, 1970, now abandoned.

This invention relates to a water emulsion paste ink for use in stencil duplication.

In the previously issued U.S. patent of Gilson et al., No. 3,421,910, description is made of a water emulsion paste ink formulated of petroleum sulfonate, tinctorial agents, a surface active agent, a polyol such as glycerol, and water and which contained a mineral oil component divided into one portion in an amount of 2 to 10 percent by weight, having an API number within the range of 20 to 26, and another portion making up 17 to 30 percent by weight of the composition, having an API number within the range of 32 to 37.

Such water emulsion paste inks, while representing an improvement over previous emulsion inks formulated with but a single mineral oil component, are limited in their emulsion stability.

Thus, it is an object of this invention to produce a water emulsion paste ink for stencil duplication having improved emulsion stability, in which more control is available for the slow release of water, and which gives longer useful life in the production of copies of good quality by stencil duplication.

It has been found that the emulsion stability of an ink of the type described in the aforementioned patent can be unexpectedly improved by formulation of the ink composition without a polyol, a component heretofore believed to be essential to the ink composition described in the aforementioned patent. Whatever the reason, it has been found that formulation of the ink composition without glycerol or other polyol yields an emulsion ink that has good emulsion stability, exhibits a much slower rate of emulsion breakdown and which releases water slowly at a controllable rate.

The mineral oil component is divided into one component having an API number less than 26 and another component having an API number above 32. The first component having an API number less than 26, and preferably within the range of 20 to 26, is employed in the ink composition in an amount within the range of 2 to 10 percent, and preferably within the range of 4 to 7 percent by weight, and the component having an API number greater than 32, and preferably within the range of 32 to 37, is employed in an amount within the range of 4 to 20 percent by weight, and preferably 8 to 12 percent by weight of the ink composition.

The following examples, representative of the practice of this invention, are given by way of illustration, but not by way of limitation:

EXAMPLE 1

| Ingredient: | Percent by weight |
|---|---|
| Petroleum sulfonate | 14.0 |
| Mineral oil (API 20 to 26) | 4.5 |
| Mineral oil (API 32 to 37) | 16.9 |
| Rosin | 1.1 |
| Carbon black (40% dispersion) | 12.5 |
| Nonionic wetting agent | 8.9 |
| Bactericide | 0.1 |
| Water | 42.0 |
| | 100.0 |

EXAMPLE 2

| Ingredients | Broad range | Preferred range |
|---|---|---|
| Petroleum sulfonate | 5 to 30 | 10 to 20. |
| Mineral oil (API 20 to 26) | 2 to 20 | 2 to 10. |
| Mineral oil (API 32 to 37) | 4 to 30 | 5 to 20. |
| Rosin | 0.5 to 4 | 1 to 3. |
| Tinctorial agent (solids) | 2 to 10 | 4 to 7. |
| Wetting agent | 3 to 20 | 5 to 15. |
| Bactericide | 0.001 to 0.5 | 0.01 to 0.5. |
| Water | Balance | Balance. |

In the foregoing examples, all of the ingredients except the water and pigment dispersion are combined and then the water and pigment dispersion are slowly added with stirring to form a composition in the form of a paste which can be packaged into tubes or other suitable containers.

As used herein, the term "petroleum sulfonate" refers to alkali metal or alkaline earth metal petroleum sulfonate, such as sodium, calcium or potassium petroleum sulfonate. In the foregoing examples, the petroleum sulfonate is embodied as a composition identified as Petronate L, of which 63% is petroleum sulfonate in mineral oil, the amount of which is included within the amount of mineral oil having an API within the range of 32 to 37.

As the tinctorial agent, use can be made of a dyestuff or pigment but, in the preferred practice of this invention, it is desirable to make use of carbon black in the form of a carbon black dispersion in aqueous medium, as illustrated in Example 1. When use is made of a dyestuff it is sufficient to make use of 3 to 7 percent by weight of the dyestuff to impart the desired color intensity. When use is made of a pigment such as dispersed carbon black, the pigment can be employed in an amount within the range of 2 to 10 percent by weight and preferably 4 to 7 percent by weight of the ink composition.

As the nonionic wetting agent, use can be made of sorbitol monooleate or other nonionic surface active agents such as polyhydric alcohol esters of high molecular weight organic or fatty acids, as represented by sorbitan sesquioleate, sorbitan monostearate, sorbitan trioleate, sorbitan monolaurate polyoxyethylene derivatives, sorbitan monopalmitate polyoxyethylene derivatives, and sorbitan monostearate polyoxyethylene derivatives.

Instead of rosin, use can be made of other rosinates or salts or esters of abietic acid wherein such rosin or rosinate is present in the ink composition in the amount set forth in Example 2.

It will be apparent from the foregoing that we have provided a new and improved composition for stencil duplicating paste inks which are characterized by good emulsion stability, long shelf life and little release of water even when employed in warm atmospheres or in areas which are not air conditioned.

It will be understod that changes may be made in the details of formulation without departing from the spirit of the invention, especially as defined in the following claims.

What is claimed is:

1. A stencil duplicating paste ink consisting essentially of 5 to 30 percent by weight petroleum sulfonate, 2 to 20 percent by weight of mineral oil having an API number below 26, 4 to 30 percent by weight of mineral oil having an API number above 32, 0.5 to 4 percent by weight of a rosin selected from the group consisting of rosin, a rosinate, and salts thereof, 2 to 10 percent by weight of a tinctorial agent in the form of a dyestuff or pigment, 3 to 20 percent by weight of a nonionic surface active agent selected from the group consisting of polyhydric alcohol esters of high molecular weight carboxylic acids and polyoxyethylene derivatives thereof, the balance being water.

2. A stencil duplicating paste ink as claimed in Claim 1 in which the mineral oil having an API number below 26 is a mineral oil having an API number within the range of 20 to 26.

3. A stencil duplicating paste ink as claimed in Claim 1 in which the mineral oil having an API number above 32 is a mineral oil having an API number within the range of 32 to 37.

4. A stencil duplicating paste ink as claimed in Claim 1 in which the surface active agent is sorbitol monooleate.

5. A stencil duplicating paste ink as claimed in Claim 1 in which the tinctorial agent is carbon black and in which the carbon black is present in an amount within the range of 2 to 10 percent by weight of the ink composition.

6. A stencil duplicating paste ink as claimed in Claim 6 in which the carbon black is of an amount within the range of 4 to 7 percent by weight.

7. A stencil duplicating paste ink consisting essentially of 10 to 20 percent by weight petroleum sulfonate, 2 to 10 percent by weight of a mineral oil having an API number within the range of 20 to 26, 5 to 20 percent by weight of a mineral oil having an API number within the range of 32 to 37, 1 to 3 percent by weight of a rosin compound, 4 to 7 percent by weight of a tinctorial agent, 5 to 15 percent by weight of a surface active agent selected from the group consisting of polyhydric alcohol esters of high molecular weight carboxylic acids and polyoxyethylene derivatives thereof, the balance being water.

8. A stencil duplicating paste ink as claimed in Claim 7 in which the tinctorial agent is carbon black.

9. A stencil duplicating paste ink as claimed in Claim 7 in which the rosin compound is rosin.

10. A stencil duplicating paste ink as claimed in Claim 7 in which the surface active agent is a nonionic surface active agent.

References Cited
UNITED STATES PATENTS

| | | | |
|---|---|---|---|
| 2,980,545 | 4/1961 | Shoemaker | 106—22 |
| 3,421,910 | 1/1969 | Gulson et al. | 106—30 |

ALLAN LIEBERMAN, Primary Examiner

S. M. PERSON, Assistant Examiner

U.S. Cl. X.R.

106—23